(12) United States Patent
Bell

(10) Patent No.: US 9,163,963 B2
(45) Date of Patent: Oct. 20, 2015

(54) AUGMENTED MESH DELIVERY SYSTEM

(71) Applicant: Utilidata, Inc., Providence, RI (US)

(72) Inventor: David Gordon Bell, Spokane, WA (US)

(73) Assignee: UTILIDATA, INC., Providence, RI (US)

(\*) Notice: Subject to any disclaimer, the term of this patent is extended or adjusted under 35 U.S.C. 154(b) by 0 days.

(21) Appl. No.: 14/042,110

(22) Filed: Sep. 30, 2013

(65) Prior Publication Data

US 2014/0043170 A1 Feb. 13, 2014

Related U.S. Application Data

(63) Continuation of application No. PCT/US2013/031687, filed on Mar. 14, 2013.

(60) Provisional application No. 61/680,960, filed on Aug. 8, 2012.

(51) Int. Cl.
| | |
|---|---|
| *G01D 18/00* | (2006.01) |
| *H04L 27/26* | (2006.01) |
| *H04Q 9/00* | (2006.01) |

(52) U.S. Cl.
CPC ............ *G01D 18/004* (2013.01); *G01D 18/002* (2013.01); *H04L 27/2634* (2013.01); *H04Q 9/00* (2013.01); *H04Q 2209/25* (2013.01); *H04Q 2209/60* (2013.01)

(58) Field of Classification Search
CPC ............ H04L 25/0264; H04L 25/0268; H04L 25/0272; H04L 27/26; H04L 27/2601; H04L 27/2628; H04L 27/263; H04L 27/2634; H04L 27/2636; H04Q 2209/25; H04Q 2209/60; H04Q 9/00; G01R 23/02; G01R 21/00; G01D 18/002; G01D 18/004

USPC ................ 375/219, 220, 222, 257, 259, 260; 340/870.02, 870.04, 870.07, 870.15; 700/286, 291, 296–298; 702/57, 702/60–62, 64–66, 75–79

See application file for complete search history.

(56) References Cited

U.S. PATENT DOCUMENTS

| | | |
|---|---|---|
| 8,437,883 B2 | 5/2013 | Powell et al. |
| 8,577,510 B2 | 11/2013 | Powell et al. |

(Continued)

OTHER PUBLICATIONS

International Search Report and Written Opinion issued Jul. 23, 2013 in PCT Application No. PCT/US2013/031687 (12 pages).

(Continued)

*Primary Examiner* — Young T Tse

(74) *Attorney, Agent, or Firm* — Foley & Lardner LLP; Christopher J. McKenna; Chethan K. Srinivasa

(57) ABSTRACT

A method is disclosed including receiving with a controller at a destination node signal samples and associated sampling time indications. The signal samples and the associated sampling time indications are received from a source node via a mesh network. The signal samples are delivered with sampling time indications generated at the source node to form a series of signals corresponding to one or more characteristic(s) related to electricity supplied to one or more electrical devices from a power source. The method also includes applying a time domain convolution procedure to the received signal in the time domain that is uniformly sampled. The weighting of sample values in time domain convolution procedure is determined at least partially based on information indicative of the statistical behavior of a corresponding realized sample process.

35 Claims, 5 Drawing Sheets

Destination Controller

(56) References Cited

U.S. PATENT DOCUMENTS

| | | | |
|---|---|---|---|
| 2004/0125740 | A1 | 7/2004 | Gardner |
| 2004/0139135 | A1 | 7/2004 | Druck |
| 2006/0195229 | A1 | 8/2006 | Bell et al. |
| 2007/0013547 | A1 | 1/2007 | Boaz |
| 2007/0096747 | A1 | 5/2007 | Wells |
| 2007/0113048 | A1* | 5/2007 | Royer et al. ............ 712/34 |
| 2008/0069034 | A1 | 3/2008 | Buddhikot et al. |
| 2008/0071482 | A1 | 3/2008 | Sweigle et al. |
| 2009/0276173 | A1 | 11/2009 | Wang et al. |
| 2010/0090674 | A1 | 4/2010 | Bell |
| 2010/0202436 | A1 | 8/2010 | Albert et al. |
| 2010/0281090 | A1 | 11/2010 | Chan et al. |
| 2011/0066297 | A1 | 3/2011 | Saberi et al. |
| 2011/0195657 | A1* | 8/2011 | Takeda et al. ............ 455/7 |
| 2012/0084036 | A1 | 4/2012 | Booman et al. |
| 2014/0265574 | A1 | 9/2014 | Tyler et al. |
| 2014/0277796 | A1 | 9/2014 | Peskin et al. |
| 2014/0277813 | A1 | 9/2014 | Powell et al. |
| 2014/0277814 | A1 | 9/2014 | Hall et al. |
| 2014/0312693 | A2 | 10/2014 | Powell et al. |

OTHER PUBLICATIONS

International Preliminary Report on Patentability issued Aug. 22, 2013 in PCT Application No. PCT/US2012/024519.

International Search Report and Written Opinion issued Sep. 27, 2012 in PCT Application No. PCT/US2012/024519.

US Notice of Allowance in U.S. Appl. No. 13/369,794 dated Jan. 7, 2014.

US Office Action in U.S. Appl. No. 13/369,794 dated Sep. 9, 2013.

US Office Action in U.S. Appl. No. 14/042,126 dated Mar. 18, 2014.

Eng, F., Gunnarsson, F., and Gustafsson, F., "Frequency Domain Analysis of Signals with Stochastic Sampling Times", IEEE Trans SP vol. 56, No. 7, pp. 3089-3099, Jul. 2008.

Eng, Frida, and Gustafsson, Frederik, "Algorithms for Downsampling Non-uniformly 10 Sampled Data", 15th European Signal Processing Conference Proceedings, 2007.

US Office Action for U.S. Appl. No. 14/042,126 dated Mar. 17, 2015.

US Notice of Allowance to U.S. Appl. No. 14/042,126 Dated Jul. 7, 2015.

\* cited by examiner

Destination Controller

AUGMENTED MESH DELIVERY SYSTEM

RELATED APPLICATIONS

The present application is a continuation of and claims priority to International Application PCT/US2013/031687, with an international filing date of Mar. 14, 2013, which claims the benefit of U.S. Provisional Patent Application No. 61/680,960, filed Aug. 8, 2012, the entire contents of which are incorporated herein by reference.

The present application is also related to, and incorporates by reference in its entirety all subject matter of the applications listed in Appendix A.

BACKGROUND

The present disclosure relates to delivering information via a mesh telemetry system and more particularly to delivering data using a delivery system having variable transport delay or where data messages can be lost and/or unrecovered or both.

When delivering signals using telemetry systems (e.g., mesh telemetry systems), some samples of the source signal may be delayed or lost. Further the delay at which the signal samples arrive from the source is unpredictable thereby degrading the signal for purposes requiring uniformly sampled time series signals. Because certain signal samples may be lost, the lost information contained in the source signal may not be fully reconstructed.

SUMMARY

A process is described in which a controller receives at a destination node signal samples and associated sampling time indications. The sampling method may be chosen based on the characteristics of the subject signal or based on the requirements of the user of the recovered signal, and may for example include zero-order-hold sampling, first-order-hold sampling, or integrating sampling. The signal recovery method disclosed herein is not limited by any choice of sampling method. The "associated sampling time indications" may be derived from an actual sample interval (e.g. a time difference between that of the present and previous samples) for each observation (sample) of the non-uniformly sampled signal to be recorded. The signal samples and the associated sampling time indications are received by a controller from a source node via a mesh network. The signal samples may be delivered with associated sampling time indications at the source node to form sampled time series of one or more signals corresponding to a characteristic related to electricity supplied to one or more electrical devices from a power source. In another implementation, the associated sampling time indications may be derived from a sampling clock in the controller. The controller applies a compacting algorithm to the received samples and the received or derived associated sampling time indications to generate a paired vector that includes the compacted signal samples and an associated compacted time indication. The paired vector, representing the compacted non-uniformly sampled signal, is transformed from a sampled time domain into a discrete Fourier spectrum of the signal in a frequency domain (aka discrete spectral representation) where the discrete Fourier spectrum of the signal is uniformly sampled in the frequency domain (that is, the spectrum is known at discrete uniformly spaced frequencies). A low-pass filter is applied in the frequency domain to the discrete Fourier spectrum of the signal to generate a filtered discrete spectral representation. An inverse discrete Fourier transform of the filtered discrete spectral representation is applied to generate a recovered signal in the time domain that is uniformly sampled.

In another implementation the method further includes, but is not limited to, providing an adjustment signal to adjust one or more of the characteristics of the electricity supplied from the power source based on the recovered signal.

In an additional implementation, applying a filter in the frequency domain to the discrete Fourier spectrum of the signal to generate a filtered discrete spectral representation includes, but is not limited to, applying a bandpass pass filter in the frequency domain to the discrete Fourier spectrum of the signal. In a further implementation, applying a filter in the frequency domain to the discrete Fourier spectrum of the signal to generate a filtered discrete spectral representation includes, but is not limited to, applying a low pass filter in the frequency domain to the discrete Fourier spectrum of the signal.

In another implementation, applying an inverse discrete Fourier transform of the filtered discrete spectral representation to generate a recovered signal in the time domain that is uniformly sampled includes, but is not limited to, applying an inverse discrete Fourier transform to the filtered discrete spectral representation to generate the recovered signal in the time domain that is uniformly sampled.

In another implementation, applying with the controller a compacting algorithm to the received samples and the received or derived associated sampling time indications to generate a paired vector comprising samples and an associated compacted time indication further includes, but is not limited to, determining void indications in the received signal samples, and indicating a sampling time for each of the determined void indications.

In a further implementation, a characteristic related to electricity supplied to one or more electrical devices from a power source includes, but is not limited to, voltage, current, real power, power flow direction, reactive power, temperature or humidity.

In another implementation, the mesh network includes a plurality of emitters, wherein a first emitter of the plurality of emitters is operable to connect to a second one of the plurality of emitters to form a path to deliver signals between the source node and the destination node, and wherein the at least the first emitter is operable to automatically connect to a third emitter of the plurality of emitters to form a new path between the source node and the destination node when interference is present between the first emitter and the second emitter.

In a further implementation, the attenuation characteristics of the low pass frequency filter are set related to the rate at which the one or more of the characteristics of the electricity supplied from the power source can be adjusted.

In another implementation, applying an inverse discrete Fourier transform of the filtered discrete spectral representation to generate a recovered signal in the time domain that is uniformly sampled includes, but is not limited to extrapolating future values of the recovered signal in the time domain by setting the time basis in the inverse discrete Fourier transform to be greater than the total age of the compacted source signal, and wherein the adjustment signal is provided based on the extrapolated future values to compensate for a group delay of the filter.

In an additional implementation, the signal samples are non-uniformly delivered to the destination node from the source node via the mesh network.

In another implementation, delivering the signal samples being delivered with time indications includes, but is not limited to, delivering the signal samples with an associated sampling time indication or with a delivery time indications.

In a further implementation, the associated compacted time indication indicates a time of arrival of the samples at the destination node or an actual time of the sample of the characteristic.

In another implementation, a system is disclosed including a source controller comprising a device to detect measurements corresponding to a characteristic of electricity supplied to one or more electrical devices from a power source. A sampler uniformly samples at intervals the detected measurements and a transmitter transmits via a mesh network the sampled detected measurements and associated time indications of the detected measurements. A destination controller is provided that includes a receiver to receive from the source controller via the mesh network signal samples and associated sampling time indications. The sampled signals may or may not be uniformly sampled if the mesh telemetry system fails to correctly transmit and receive any given such sample. The signal samples are delivered with associated sampling time indications at the source node to form a sampled signal corresponding to a characteristic related to electricity supplied to one or more electrical devices from a power source. In another implementation, the associated sampling time indications may be derived from a sampling clock in the controller. The controller includes a device to apply a compacting algorithm to the received samples and the received or derived associated time indications to generate a paired vector comprising a compacted sample record and an associated compacted sampling time indication. The destination controller also implements a transform process to transform the paired vector representing the sampled signal in a time domain into a discrete Fourier spectrum of the signal in the frequency domain where the discrete Fourier spectrum of the signal is uniformly sampled in the frequency domain. A low pass or band-pass filter in the frequency domain is applied to filter the discrete Fourier spectrum of the signal to generate a filtered discrete spectral representation, and an inverse discrete Fourier transform device is included to transform the filtered discrete spectral representation into a recovered signal in the time domain that is uniformly sampled. The characteristics of the low pass and band-pass filters may be set depending on the intended use for the recovered signal. In an additional implementation, the destination controller comprises a second transmitter to provide an adjustment signal to adjust one or more of the characteristics of the electricity supplied from the power source based on the recovered signal.

In addition, a computer readable storage medium comprising instructions is disclosed. The instructions when executed by a processor receives with a controller at a destination node signal samples and associated sampling time indications, the signal samples and the associated sampling time indications being received from a source node via a mesh network. The signal samples are delivered with associated sampling time indications at the source node to form a sampled signal corresponding to a characteristic related to electricity supplied to one or more electrical devices from a power source. The instructions apply with the controller a compacting algorithm to the received samples and the received or derived associated time indications to generate a paired vector comprising compacted samples and an associated compacted sampling time indication, and transform the paired vector representing the sampled signal in a time domain into a discrete Fourier spectrum of the signal in the frequency domain where the discrete Fourier spectrum of the signal is in a uniformly sampled in the frequency domain. The instructions also apply a filter in the frequency domain to the discrete Fourier spectrum of the signal to generate a filtered discrete spectral representation, and apply an inverse discrete Fourier transform of the filtered discrete spectral representation to generate a recovered signal in the time domain that is uniformly sampled.

In general, the preceding describes techniques in which a controller receives at a destination node signal samples and associated sampling time indications. The sampling method may be chosen based on the characteristics of the subject signal or based on the requirements of the user of the recovered signal, and may for example include zero-order-hold sampling, first-order-hold sampling, or integrating sampling. The signal recovery method disclosed herein is not limited by any choice of sampling method. The "associated sampling time indications" may be derived from an actual sample interval (e.g. a time difference between that of the present and previous samples) for each observation (sample) of the non-uniformly sampled signal to be recorded. The signal samples and the associated sampling time indications are received by a controller from a source node via a mesh network. The signal samples may be delivered with associated sampling time indications at the source node to form sampled time series of one or more signals corresponding to a characteristic related to electricity supplied to one or more electrical devices from a power source.

In some embodiments, the associated sampling time indications may be derived from a sampling clock in the controller. The controller applies a compacting algorithm to the received samples and the received or derived associated sampling time indications to generate a paired vector that includes the compacted signal samples and an associated compacted time indication. The paired vector, representing the compacted non-uniformly sampled signal, is transformed from a sampled time domain into a discrete Fourier spectrum of the signal in a frequency domain (aka discrete spectral representation) where the discrete Fourier spectrum of the signal is uniformly sampled in the frequency domain (that is, the spectrum is known at discrete uniformly spaced frequencies). In some embodiments, the transformation is accomplished using an Approximate Fourier Transform or AFT. A low-pass filter is applied in the frequency domain to the discrete Fourier spectrum of the signal to generate a filtered discrete spectral representation. An inverse discrete Fourier transform of the filtered discrete spectral representation is applied to generate a recovered signal in the time domain that is uniformly sampled.

The present following describes a number of techniques which may be used in conjunction with the techniques described above. First, a modification to the Approximate Fourier Transform algorithm is described. In some embodiments, this technique improves the performance of the algorithm on signals that include long intervals with void (i.e., missing) samples. These techniques may optionally be used in any of the techniques described below.

Second, an alternate to the inverse transform is described that improves performance, e.g., for applications where a high level of retention of the spectral content of the input signal is required. In some embodiments, the alternative inverse transform preserves more of the high-frequency content of the input signal than the techniques described above.

Third, a class of sample recovery algorithms which operate only in the time domain is presented. In some embodiments, the algorithms apply a statistical weighting technique reduce or eliminate distortions caused by long void sample intervals.

One implementation is a method, including receiving with a controller at a destination node signal samples and associated sampling time indications. The signal samples and the associated sampling time indications are received from a source node via a mesh network. The signal samples are delivered with sampling time indications generated at the source node to form a series of signals corresponding to one or more characteristics related to electricity supplied to one or more electrical devices from a power source. The method also includes applying with the controller a compacting algorithm to the received signal samples and the received associated sampling time indications to generate a paired vector comprising compacted signal samples and an associated compacted sampling time indication. The method also includes transforming the paired vector representing the compacted sampled signal in a time domain into a discrete Fourier spectrum of the signal in the frequency domain using a modified Approximate Fourier Transform such that the discrete Fourier spectrum of the compacted sampled signal is uniformly sampled in the frequency domain. The method also includes applying a filter in the frequency domain to the discrete Fourier spectrum of the signal to generate a filtered discrete spectral representation. The method also includes applying an inverse discrete Fourier transform of the filtered discrete spectral representation to generate a recovered signal in the time domain that is uniformly sampled. The weighting of sample values in the modified Approximate Fourier Transform is determined at least partially based on information indicative of the statistical behavior of a corresponding realized sample process.

In another implementation, the method also includes providing an adjustment signal to adjust one or more of the characteristics of the electricity supplied from the power source based on the recovered signal.

In another implementation, applying a filter in the frequency domain to the discrete Fourier spectrum of the signal to generate a filtered discrete spectral representation includes applying a bandpass pass filter in the frequency domain to the discrete Fourier spectrum of the signal.

In another implementation, applying a filter in the frequency domain to the discrete Fourier spectrum of the signal to generate a filtered discrete spectral representation includes applying a low pass filter in the frequency domain to the discrete Fourier spectrum of the signal.

In another implementation, applying an inverse discrete Fourier transform of the filtered discrete spectral representation to generate a recovered signal in the time domain that is uniformly sampled includes applying an inverse discrete Fourier transform to the filtered discrete spectral representation to generate the recovered signal in the time domain that is uniformly sampled.

In another implementation, applying with the controller a compacting algorithm to the received signal samples and the received associated sampling time indications to generate a paired vector comprising samples and an associated compacted time indication also includes determining void indications in the received signal samples and indicating a sampling time for each of the determined void indications.

In another implementation, a characteristic related to electricity supplied to one or more electrical devices from a power source includes at least one of voltage, current, real power, power flow direction, reactive power, temperature or humidity.

In another implementation, the mesh network includes a plurality of emitters. A first emitter of the plurality of emitters is operable to connect to a second one of the plurality of emitters to form a path to deliver signals between the source node and the destination node. The at least the first emitter is operable to automatically connect to a third emitter of the plurality of emitters to form a new path between the source node and the destination node when interference is present between the first emitter and the second emitter.

In another implementation, the attenuation characteristics of the low pass frequency filter are set related to the rate at which the one or more of the characteristics of the electricity supplied from the power source can be adjusted.

In another implementation, applying an inverse discrete Fourier transform of the filtered discrete spectral representation to generate a recovered signal in the time domain that is uniformly sampled includes extrapolating future values of the recovered signal in the time domain by setting the time basis in the inverse discrete Fourier transform to be greater than the total age of the compacted source signal. The adjustment signal is provided based on the extrapolated future values to compensate for a group delay of the filter.

In another implementation, the signal samples are non-uniformly delivered to the destination node from the source node via the mesh network.

In another implementation, delivering the signal samples being delivered with sampling time indications includes delivering the signal samples with an associated sampling time indication or with delivery time indications.

In another implementation, the associated compacted sampling time indications are derived from an actual sample interval for each sample. The actual sample interval is a time difference between that of a present sample and a previous sample.

Another implementation is a method including receiving with a controller at a destination node signal samples and associated sampling time indications. The signal samples and the associated sampling time indications are received from a source node via a mesh network. The signal samples are delivered with sampling time indications generated at the source node to form a series of signals corresponding to one or more characteristics related to electricity supplied to one or more electrical devices from a power source. The method also includes applying a time domain convolution procedure to the received signal in the time domain that is uniformly sampled. The weighting of sample values in time domain convolution procedure is determined at least partially based on information indicative of the statistical behavior of a corresponding realized sample process.

In another implementation, applying a time domain convolution procedure to the received signal includes convolving the received signal with a filter impulse response function to generate a uniformly resampled recovered signal.

In another implementation, $u(t_k)$ is the input signal sample at sample time $t_k$, $h(t)$ is the impulse response function, the resampled recovered signal has a resampling period of $1/T$, and the recovered signal having sample values at M uniform intervals is calculated as $$v(mT) = \frac{1}{t_n} \sum_{k=1}^{n} (t_k - t_{k-1}) h(mT - t_k) u(t_k),$$

where m=1, 2, 3, . . . M.

In another implementation, convolving the received signal with a filter impulse response function to generate a uniformly resampled recovered signal includes performing a convolution summation. Each term in the summation is weighted by a factor that is proportional to the corresponding realized sample interval.

In another implementation, the method also includes modifying the weighting factors based on a statistical metric statistical metric of a realized sampling process of the received signal.

In another implementation, the method also includes determining a run length probability density function corresponding to the realized sampling process. The method also includes determining the modified weighting factors based on an estimated sample run probability density function.

In another implementation, the sample run probability density function is an alpha-stable density function.

In another implementation, the method also includes applying with the controller a compacting algorithm to the received signal samples and the received associated sampling time indications to generate a paired vector including compacted signal samples and an associated compacted sampling time indication.

In another implementation, the method also includes providing an adjustment signal to adjust one or more of the characteristics of the electricity supplied from the power source based on the recovered signal.

In another implementation, applying with the controller a compacting algorithm to the received signal samples and the received associated sampling time indications to generate a paired vector including samples and an associated compacted time indication also includes determining void indications in the received signal samples and indicating a sampling time for each of the determined void indications.

In another implementation, a characteristic related to electricity supplied to one or more electrical devices from a power source includes at least one of voltage, current, real power, power flow direction, reactive power, temperature or humidity.

In another implementation, the mesh network includes a plurality of emitters. A first emitter of the plurality of emitters is operable to connect to a second one of the plurality of emitters to form a path to deliver signals between the source node and the destination node. The at least first emitter is operable to automatically connect to a third emitter of the plurality of emitters to form a new path between the source node and the destination node when interference is present between the first emitter and the second emitter.

In another implementation, the signal samples are non-uniformly delivered to the destination node from the source node via the mesh network.

In another implementation, delivering the signal samples being delivered with sampling time indications includes delivering the signal samples with an associated sampling time indication or with delivery time indications.

In another implementation, the associated compacted sampling time indications are derived from an actual sample interval for each sample. The actual sample interval is a time difference between that of a present sample and a previous sample.

Another implementation is a method including receiving with a controller at a destination node signal samples and associated sampling time indications. The signal samples and the associated sampling time indications are received from a source node via a mesh network. The signal samples are delivered with sampling time indications generated at the source node to form a series of signals corresponding to one or more characteristic(s) related to electricity supplied to one or more electrical devices from a power source. The method also includes applying with the controller a compacting algorithm to the received signal samples and the received associated sampling time indications to generate a paired vector comprising compacted signal samples and an associated compacted sampling time indication. The method also includes transforming the paired vector representing the compacted sampled signal in a time domain into a discrete Fourier spectrum of the signal in the frequency domain using a Approximate Fourier Transform such that the discrete Fourier spectrum of the compacted sampled signal is uniformly sampled in the frequency domain. The method also includes, based on the Fourier spectrum, applying an iterative Adaptive weight conjugate gradient Toeplitz (ACGT) procedure to the generate a recovered signal in the time domain that is uniformly sampled.

In another implementation, the method also includes prior to applying the AGCT procedure specifying an initial convergence criteria for the ACGT procedure.

In another implementation, the method also includes estimating a uniformly sampled recovered signal using the ACGT such that the recovered sampling interval is a desired nominal interval for the input signal.

In another implementation, the recovered signal includes a specified number of forecasted.

In another implementation, the method also includes determining convergence information indicative of the number of iterations of the ACGT procure required to achieve the initial convergence criteria.

In another implementation, the method also includes determining a revised convergence criteria based on the convergence information and information indicative of sample availability of each input signal realization.

In another implementation, the method also includes constraining the allowable number of iterations of the ACGT algorithm.

In another implementation, convergence is determined on the basis of a criterion other than an absolute error criterion.

In another implementation, the criterion is based at least in part on a rate of decrease of absolute error.

In another implementation, the method also includes providing an adjustment signal to adjust one or more of the characteristics of the electricity supplied from the power source based on the recovered signal.

In another implementation, applying a filter in the frequency domain to the discrete Fourier spectrum of the signal to generate a filtered discrete spectral representation includes applying a bandpass pass filter in the frequency domain to the discrete Fourier spectrum of the signal.

In another implementation, applying a filter in the frequency domain to the discrete Fourier spectrum of the signal to generate a filtered discrete spectral representation includes applying a low pass filter in the frequency domain to the discrete Fourier spectrum of the signal.

In another implementation, n applying an inverse discrete Fourier transform of the filtered discrete spectral representation to generate a recovered signal in the time domain that is uniformly sampled includes applying an inverse discrete Fourier transform to the filtered discrete spectral representation to generate the recovered signal in the time domain that is uniformly sampled.

In another implementation, applying with the controller a compacting algorithm to the received signal samples and the received associated sampling time indications to generate a paired vector including samples and an associated compacted time indication also includes determining void indications in the received signal samples and indicating a sampling time for each of the determined void indications.

In another implementation, a characteristic related to electricity supplied to one or more electrical devices from a power source includes at least one of voltage, current, real power, power flow direction, reactive power, temperature or humidity.

In another implementation, the mesh network includes a plurality of emitters. A first emitter of the plurality of emitters is operable to connect to a second one of the plurality of emitters to form a path to deliver signals between the source node and the destination node. The at least the first emitter is operable to automatically connect to a third emitter of the plurality of emitters to form a new path between the source node and the destination node when interference is present between the first emitter and the second emitter.

In another implementation, the attenuation characteristics of the low pass frequency filter are set related to the rate at which the one or more of the characteristics of the electricity supplied from the power source can be adjusted.

In another implementation, applying an inverse discrete Fourier transform of the filtered discrete spectral representation to generate a recovered signal in the time domain that is uniformly sampled includes extrapolating future values of the recovered signal in the time domain by setting the time basis in the inverse discrete Fourier transform to be greater than the total age of the compacted source signal. The adjustment signal is provided based on the extrapolated future values to compensate for a group delay of the filter.

In another implementation, the signal samples are non-uniformly delivered to the destination node from the source node via the mesh network.

In another implementation, delivering the signal samples being delivered with sampling time indications includes delivering the signal samples with an associated sampling time indication or with delivery time indications.

In another implementation, the associated compacted sampling time indications are derived from an actual sample interval for each sample. The actual sample interval is a time difference between that of a present sample and a previous sample.

Another implementation is an apparatus including a controller configured to implement the method of any one of the implementations described above.

Another implementation is a non-transitory computer readable storage medium including instructions which when executed by a processor implement the method of any one of the implementations described above.

Various embodiments may include any of the above described features, either alone or in any suitable combination.

Although may of the examples provided herein relate to processing of signals delivered via a mesh telemetry system, a person skilled in the art will recognized that these techniques may be applied to other types of communication and telemetry systems (e.g., any system that manifests the loss of samples during normal operation).

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
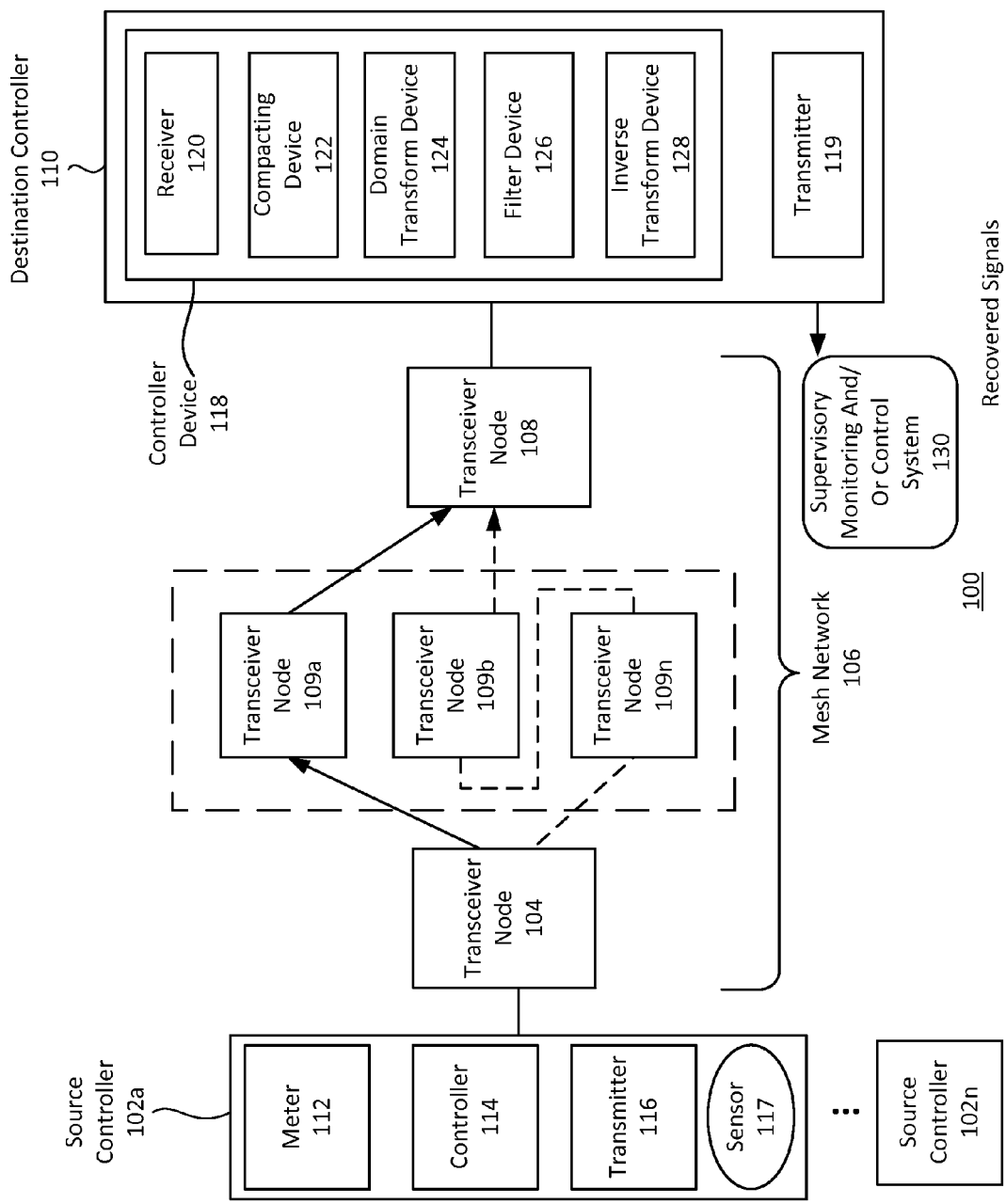
FIG. 1 is a simplified schematic diagram of a system for delivering information via a wireless mesh network.

Referring to FIG. 1, there is shown a wireless mesh delivery system 100 including source controllers 102*a*-102*n* connected via mesh network 106, including but not limited to a wireless mesh network, to destination controller 110. Exemplary Source controller 102*a* may include a meter device 112, a sampler/controller device 114, a transmitter 116 and a sensor 117. Sensor 117 senses characteristics of electrical power as delivered by a power source (not shown). Destination controller 110 includes a controller device 118 and a transceiver 119. Controller device 118 has a receiver 120, a compacting device 122, a domain transform device 124, a filter device 126 and an inverse transform device 128. Destination controller 110 may be coupled to a supervisory monitoring and/or control system 130.

Mesh network 106 includes a transceiver node 104, transceiver node 108, and additional transceiver nodes 109*a*-109*n* (also referred to herein as emitters). Transceiver nodes (such as nodes 104 or 108) receive signals from other nodes either via a wireless or wireline connection, and feed the received signals to a controller. Transceiver nodes (such as nodes 104 or 108) may transmit signals from other nodes either via a wireless or wireline connection in response to signals received from the controller.

In one implementation, mesh network 106 includes many emitters and a node 108 coupled with the destination controller 110. A first emitter, such as node 104, of the emitters can connect to a second emitter 109*a* of the emitters to form a path to deliver signals between the source node 102*a* and the destination node 110. The first emitter, such as node 104, may automatically connect to a third emitter, such as node 109*n*, and a fourth emitter such as emitter 109*b*, of the emitters to form a new path between the source node 102 and the destination node 110 when interference is present between the first emitter, e.g. node 104 and the second emitter, e.g. emitter 109*a*.

In one implementation, second transmitter 119 of destination controller 110 includes provides an adjustment signal to adjust one or more of the characteristics of the electricity supplied from the power source based on the recovered signal.

Meter device 112 may detect measurements corresponding to a characteristic of electricity supplied to one or more electrical devices from a power source (not shown). Sampler device 114 uniformly samples at intervals the detected measurements. Transmitter 116 transmits via mesh network 106 the sampled detected measurements and associated time indications of the detected measurements.

The receiver 120 in the destination controller 110 receives signal samples and associated sampling time indications from the source controller 102 via the mesh network 116. In one implementation, the signal samples are delivered with the associated sampling time indications to form a sampled signal corresponding to a characteristic related to electricity supplied to one or more electrical devices from the power source. The signal samples may be delivered with an associated sampling time indication or with a delivery time indications. In another implementation, the signal samples are non-uniformly delivered to the destination node 110 from the source node 102 via the mesh network.

Compacting device 122 applies a compacting algorithm to the received samples and the received or derived associated time indications to generate a paired vector that includes samples and an associated compacted sampling time indication. The associated compacted sampling time indication may indicate a time of arrival of the samples at the destination node 110 or a derived time of the sample of the characteristic (at the source nodes 102a-102n). An exemplary compacting algorithm will be described further herein in connection with FIG. 5.

Domain Transformer 124 (or Domain transform device 124) transforms the paired vector representing the compacted sampled signal in a time domain into a discrete Fourier spectrum of the signal in the frequency domain using an Approximate Fourier Transform such that the discrete Fourier spectrum of the signal is uniformly sampled in the frequency domain. In one implementation, the subject signal as received by the controller (via the telemetry system) is assumed to be non-uniformly sampled in the time domain. Further the transform process is a generalized version of the discrete Fourier transform in which each valid sample of the time domain signal is weighted by the sample time between it and the previous such valid sample, the sample time being derived from the associated sampling time indications by the sample compacting algorithm.

Filter device 126 filters in the frequency domain the discrete Fourier spectrum of the signal to generate a filtered discrete spectral representation. Inverse transformer or Inverse transform device performs an inverse discrete Fourier transform to transform the filtered discrete spectral representation into a recovered signal in the time domain that is uniformly sampled. Destination node 110 may transmit the recovered signal to a supervisor monitoring and/or control system 130. In one implementation, filter device 126 may be a low pass filter. Further the attenuation characteristics of the low pass filter are set as a function of the rate at which the one or more of the characteristics of the electricity supplied from the power source can be adjusted. In another implementation, filter device 126 may be a band pass filter. Further the attenuation characteristics of the band pass filter are determined by variations in characteristics of the recovered signal. These attenuation characteristics may be used in making adjustments to the power source.

In one implementation, the controller 110 may require estimates of certain variational characteristics in the recovered signal in order to make the adjustments to the power source. Such estimation is facilitated by first applying a bandpass filter to the signal in the recovery process.

Example Controller Architecture

Figure 2:
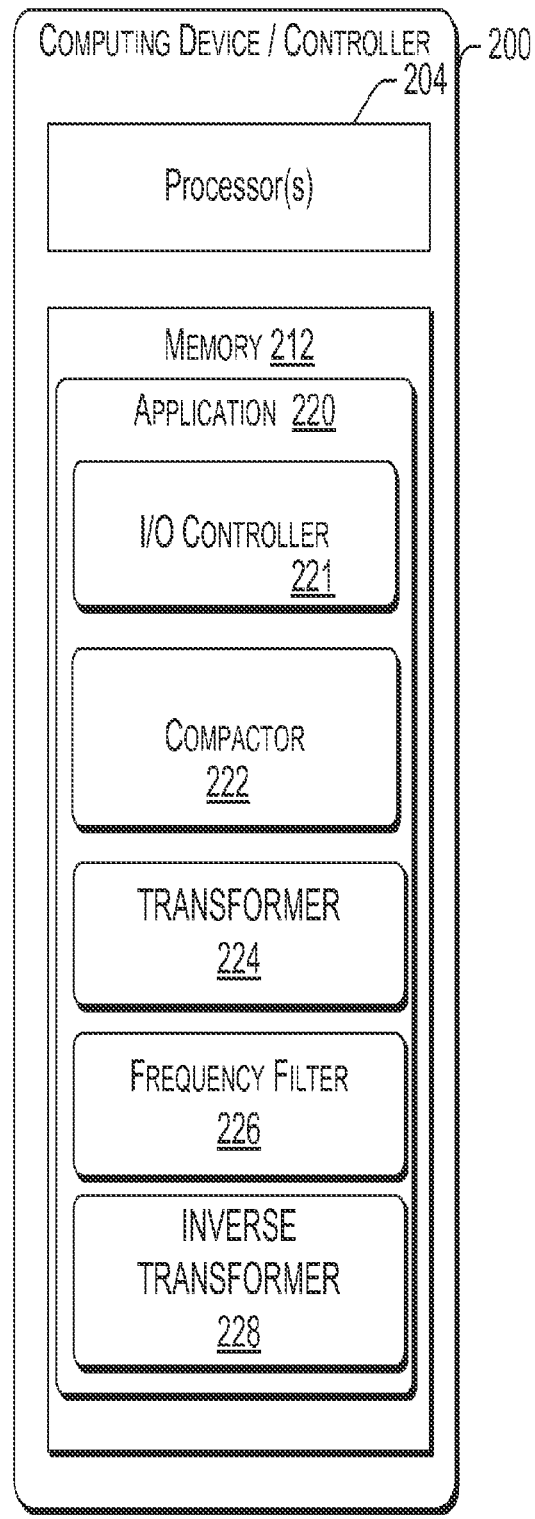
FIG. 2 is a simplified schematic diagram of a processing element that processes information delivered via a wireless mesh network.

In FIG. 2 are illustrated selected modules in Controller 200. Controller 200 may operate as a destination controller 110, may use process 300 shown in FIG. 3. In another implementation, controller 200 may operate as a source controller 102 using process 400 shown in FIG. 4. Controller 200 receives and/or transmits signals from/to a transceiver node (such as transceiver node 104 or 108). Controller 200 has processing capabilities and memory suitable to store and execute computer-executable instructions. In one example, Controller 200 includes one or more processors 204 and memory 212. In one implementation, controller 200 may be coupled with the destination node to receive signal samples and associated sampling time indications from the destination node.

The memory 212 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 212 of the Controller 200 may include an application 220 that includes modules containing instructions for execution by processor 204. Exemplary modules include an I/O controller module 221, a compactor module 222, a transform module 224, a frequency filter module 226 and an inverse transform module 228. I/O controller module 221 may contain drivers to enable controller 200 to communicate with a transceiver node (such as node 104 or node 108).

Application 220 in controller 200 receives signal samples and associated sampling time indications from the destination node 110. The signal samples are delivered with sampling time indications to form a sampled signal corresponding to one or more characteristic(s) related to electricity supplied to one or more electrical devices from the power source.

Compactor module 222 includes instructions that enable the controller to apply a compacting algorithm to the received samples and the received or derived associated sampling time indications to generate a paired vector that includes compacted samples and an associated compacted sampling time indication. Compactor module may also contain inputs, memory and outputs. The inputs include a Sampling Clock; signal samples from source nodes via the mesh network; and a Sample present/absent indicator. The memory includes signal sample values and sample times and Counters for consecutive good samples and missed (void) samples, and the outputs include Compacted Sample Record of signal samples; corresponding realized sample times (intervals); a Total age of compacted sample record and a Length of largest sampling void. The compacting algorithm as described in connection with FIG. 5 also quantifies the validity of the transform process and thus the validity of the recovered signal. The Approximate Fourier transform process may be validated by including: a maximum allowed void length, a maximum allowed total age of the compacted record, and a minimum count of known good samples in the compacted record.

Domain Transform module 224 includes instructions to transform the paired vector representing the sampled signal in a time domain into a discrete Fourier spectrum of the signal in the frequency domain by applying an Approximate Fourier Transform such that the discrete Fourier spectrum of the signal is uniformly sampled in the frequency domain, meaning that the known points in the Fourier spectrum are at equally spaced frequencies.

Frequency filter module 226 includes instructions to filter in the frequency domain the discrete Fourier spectrum of the signal to generate a filtered discrete spectral representation. Filter operation may be selected on the basis of requirements for usage of recovered signal; such as lowpass linear phase in closed loop control applications, or bandpass if signal variance is to be estimated.

Inverse transform module 228 contains instructions to transform the filtered discrete spectral representation into a recovered signal in the time domain that is uniformly sampled.

In one implementation, the destination controller includes a second transmitter to provide an adjustment signal that may be transmitted to the source controller 102 via the mesh network 106 to adjust one or more of the characteristics of the electricity supplied from the power source based on the recovered signal. Further details of the adjustment decision application and process are described in FIGS. 3 and 4.

Figure 3:
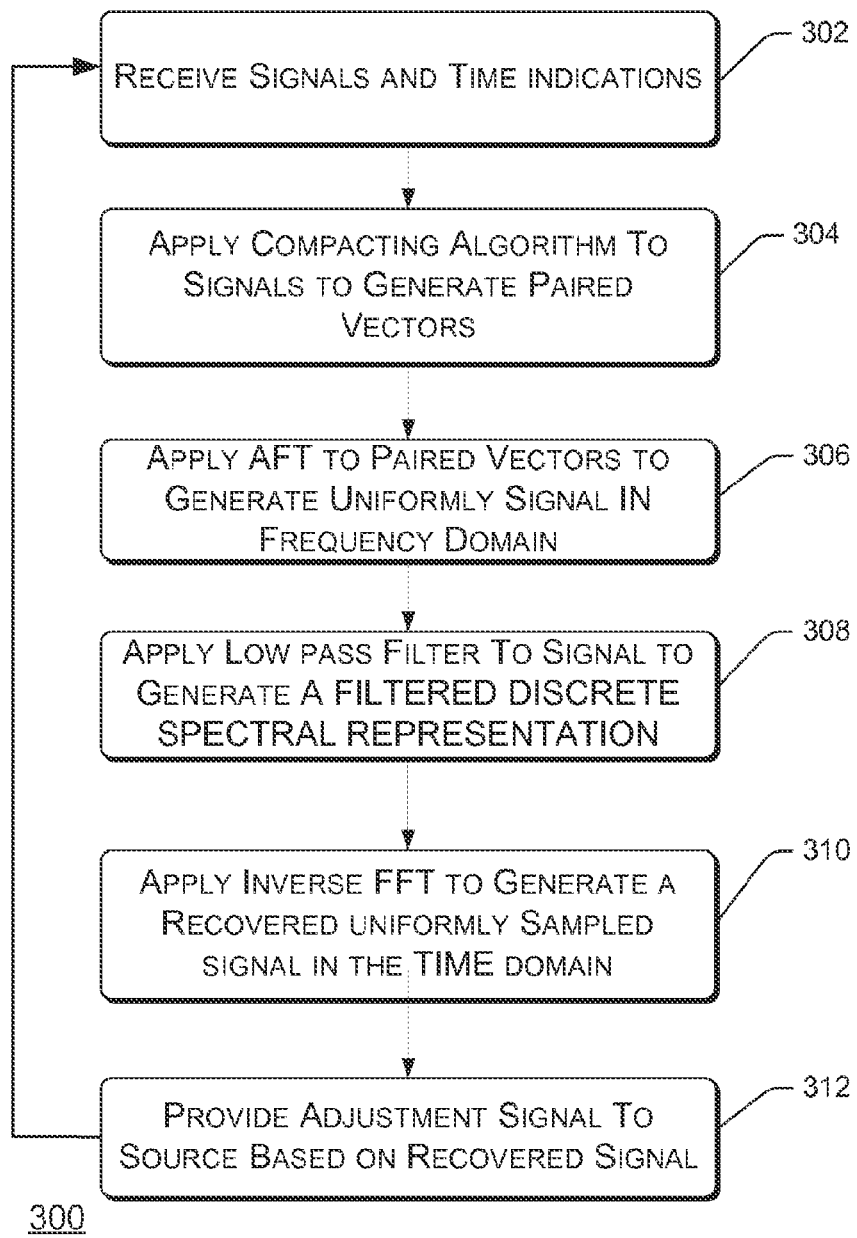
FIG. 3 is a flow chart illustrating a process executed by a destination controller used to handle information delivered via the wireless mesh network shown in FIG. 1.
Figure 4:
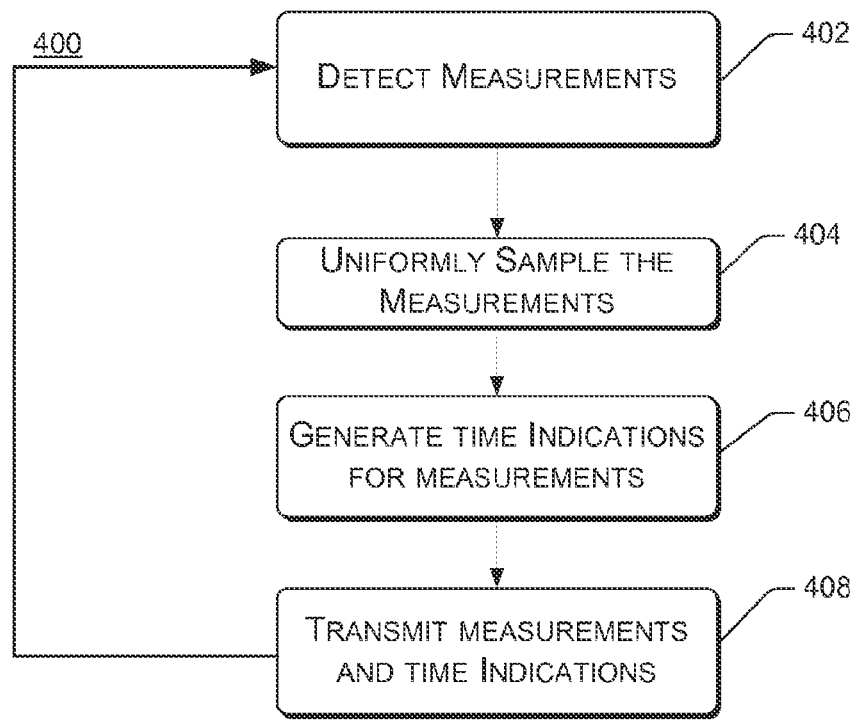
FIG. 4 is a flow chart illustrating a process executed by a source controller used to generate information for delivery via the wireless mesh network to the destination controller.

Illustrated in FIG. 3, is a process 300 executed by an exemplary destination controller 110 to recover a uniformly sampled signal from a signal received from the source controller 102. Illustrated in FIG. 4, is a process 400 executed by an exemplary source controller 102 to sampled and transmit measurements to the destination controller 110. The exemplary processes in FIG. 3 and FIG. 4 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIGS. 3 and 4, although it may be implemented in other system architectures.

Referring to FIG. 3, a process 300 is shown to generate with the destination controller 110 a recovered uniformly sampled signal in the frequency domain from a received signal.

In block 302, the destination controller 110 receives from the destination node one or more signal samples and associated sampling time indications from a source node via a mesh network. The one or more signal samples include sampling time indications and are formed into a series of one or more sampled signals corresponding to a characteristic of electricity supplied to one or more electrical devices from a power source.

In block 304, the destination controller 110 applies a compacting algorithm to the received signal samples and the received associated sampling time indications to generate a paired vector comprising samples and an associated compacted time indication. In one implementation, applying the compacting algorithm to the received samples and the received or derived associated sampling time indications to generate a paired vector comprising samples and an associated compacted sampling time indication that includes determining void indications in the received signal samples, and indicating a sampling time for each of the determined void indications.

In block 306, a paired vector representing the compacted sampled signal in a time domain is transformed into a discrete Fourier spectrum of the compacted sampled signal in the frequency domain where the discrete Fourier spectrum of the compacted sampled signal is uniformly sampled in the frequency domain. In one implementation an approximate Fourier transform (AFT) is applied to the paired vector to transform the paired vector into the discrete Fourier spectrum of the signal in the frequency domain. The AFT may be applied using techniques described in the following exemplary references:

(1) Eng, Frida, and Gustafsson, Frederik, "Algorithms for Downsampling Non-uniformly Sampled Data", 15$^{th}$ European Signal Processing Conference Proceedings, 2007.
(2) Eng, F., Gunnarsson, F., and Gustafsson, F., "Frequency Domain Analysis of Signals with Stochastic Sampling Times", IEEE Trans SP Vol. 56, No. 7, pp 3089-3099.

In block 308, a filter is applied in the frequency domain to the discrete Fourier spectrum of the signal to generate a filtered discrete spectral representation. In one implementation, a low pass filter in the frequency domain is applied to the discrete Fourier spectrum of the compacted sampled signal. The spectral attenuation and phase characteristics of the low pass filter may be set to be related to the rate at which the one or more of the characteristics of the electricity supplied from the power source can be adjusted.

In block 310, an inverse discrete Fourier transform is applied to the filtered discrete spectral representation to generate a recovered signal in the time domain that is uniformly sampled. In one implementation, an inverse Discrete Fourier transform (IDFT) is applied to the filtered discrete spectral representation to generate the recovered signal in the time domain that is uniformly sampled. In another implementation, an inverse discrete Fourier transform (IDFT) is applied to the filtered discrete spectral representation by setting an inversion time to a time greater than a total age of a compacted signal used to create the discrete spectral representation of the subject signal, and wherein the adjustment signal is provided based on the extrapolated future values to compensate for a group delay of the low-pass or band-pass filter.

In block 312, an indication is transmitted to the source controller 102 via the mesh network to adjust one or more of the characteristics of the electricity supplied from the power source based recovered signal. Exemplary characteristics related to electricity supplied to the electrical devices from a power source may include voltage, current, real power, reactive power, apparent power, power flow direction, temperature or humidity.

Referring to FIG. 4, a process 400 is shown that may be executed by source controller 102 to detect and sample measurements for transmission to destination controller 110.

In block 402, source controller 102 detects characteristics or measurements (measurements may be manifested as sampled signals) related to electricity supplied to one or more electrical devices from a power source. In block 404, source controller 102 uniformly samples the measurements and in block 406 generates time indications for the measurements. In block 408, source controller 102 transmits the measurements and time indications to destination controller 110 via mesh network. Source controller 102 repeats block 302 by detecting new measurements.

Figures 5A, 5B:
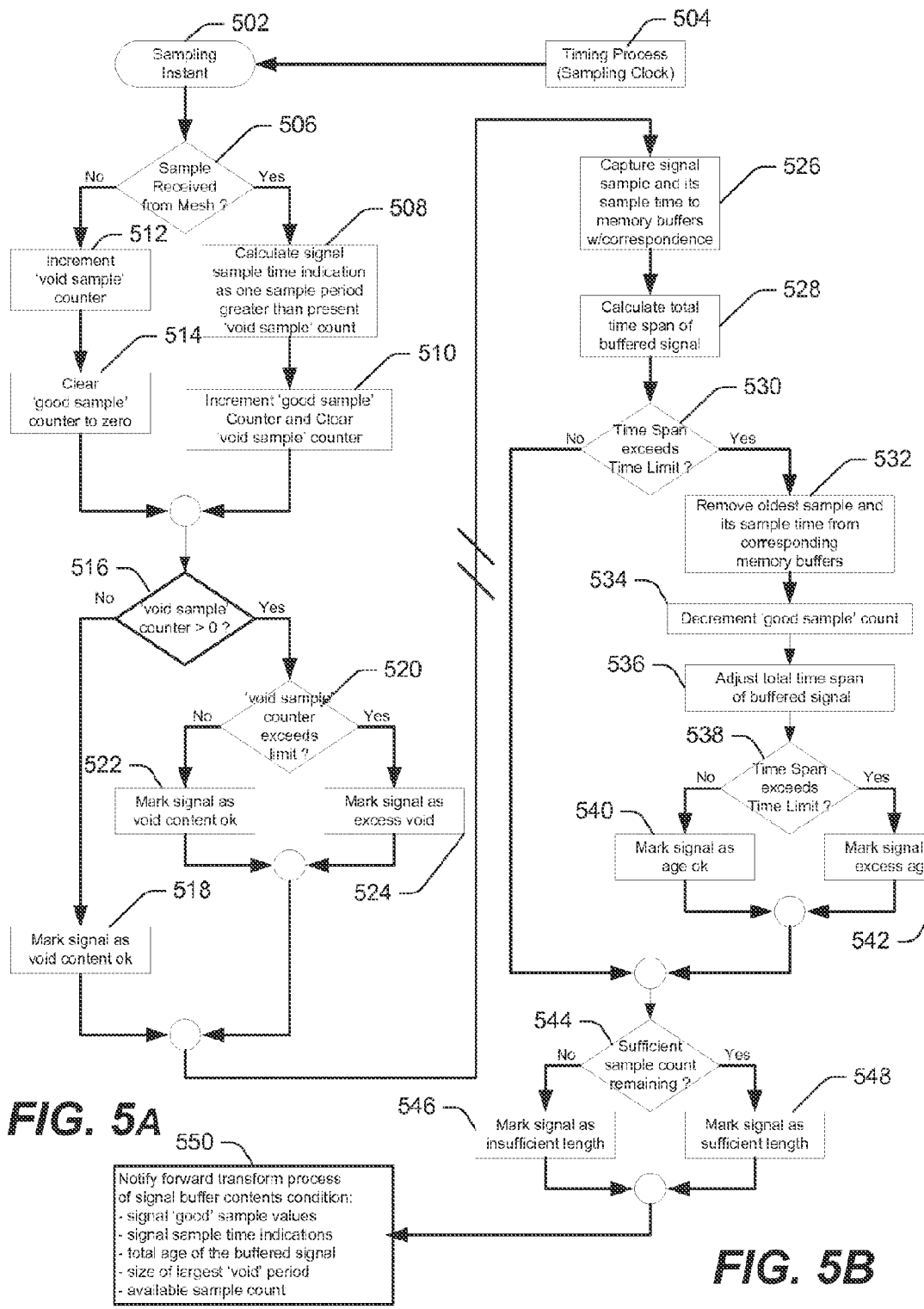
FIGS. 5*a*-5*b* are flow charts illustrating a compacting process executed in the compacting module of the computing device of FIG. 2.

Referring to FIGS. 5a-5b, a process 500 is shown that may be executed by compactor 222 in computing device 200 (FIG. 2) to execute a compacting algorithm to generate a paired vector that includes compacted signal samples and an associated compacted sampling time indication.

In block 502, the compactor 222 upon being awakened by a timing process 504, fetches a sample from the mesh communication system.

In block 506, a determination is made whether the sample is received from the mesh communication system. If a sample is received then in block 508, a signal sample time indication is calculated as one sample time period greater than present "void sample count". Then in block 510, a good sample counter is incremented and the void sample counter is cleared and set to zero. If no sample is received from the mesh communication system in block 506, the "void sample counter" is incremented and the "good sample counter" is cleared and set to zero.

In block 516, a determination is made whether the "void sample counter" is not zero. If the void sample counter is zero then in block 518, a quality marker for the sampled signal related to the void is to indicate acceptable. If the void sample counter is not zero, then the void counter is further tested to determine if the counter exceed a predetermined acceptable limit in block 520. If the void sample counter does not exceed the limit, the then in block 522, a quality marker for the sampled signal related to the void is to indicate acceptable. If the void sample counter does exceed the limit, then in block 524, a quality marker for the sampled signal related to the void is to indicate unacceptable void. [0059] Referring to FIG. 5B, after executed block 518, 522 and 524, in block 526 a signal sample and its sample time are stored in memory buffers with their correspondence to each other. In block 528, a total time span of the buffered signal is calculated. The total time span corresponds to the sum of the sample time in the sample time buffer.

In block 530, a determination is made whether the total time span exceed a predetermined acceptable age limit. The predetermined acceptable age limit may be estimated by consecutively capturing a number of signals related to the electrical power source characteristics and computing their Fourier spectra, and estimate the interval over which the Fourier spectra components of the captured signals are nominally constant (the nominally constant characteristic may be typically defined by the user of the system).

If the time span exceeds the time limit, in block 532 the oldest sample and its corresponding sample time are removed from the memory buffers. In block 534, the good sample count is decremented and in block 530, the total time span of the buffered signal is adjusted to reflect a reduced age of the sample.

In block 538, a determination is made as to whether the time span exceeds the predetermined time lime (in 530). If the time span does not exceed the time limit then in block 540, a quality marker for the sampled signal related to the age is asserted to indicate acceptable. If the time span does exceed the time limit then in block 542, a quality marker for the sampled signal related to the age is asserted to indicate excess age.

If the time span in block 530 exceeds the time limit or if the mark signal is marked in block 540 or 542, a determination is made in block 544 whether the is a sufficient sample count remaining. If there is sufficient sample count remaining, in block 546, and if the time span does not exceed the time limit then in block 546, a quality marker for the sampled signal related to the sample count is asserted to indicate insufficient length. If the time span does exceed the time limit then in block 544, a quality marker for the sampled signal related to the sample count is asserted to indicate sufficient length in block 548.

In block 550 domain transformer 124 is notified of: signal buffer contents condition, signal 'good' sample values, signal sample time indications, total age of the buffered signal, a size of largest 'void' period, and an available sample count.

I. MODIFIED AFT

As described above, in some embodiments, the compaction algorithm records the realized intervals between available samples in the input signal, which in general are not constant. That is, the sampling is not uniform.

To deal with this issue, an Approximate Fourier Transform (AFT) was described. The AFT operates to transform an the input signal possibly having void samples, and output a discrete Fourier spectrum of the signal in a frequency domain (aka discrete spectral representation) where the discrete Fourier spectrum of the signal is uniformly sampled in the frequency domain (that is, the spectrum is known at discrete uniformly spaced frequencies). An exemplary AFT algorithm is described in Reference [3] (algorithm). The algorithm has the form $$U(f_i) = \sum_{m=1}^{M} \tau_m u(t_m) e^{-j2\pi f_i t_m} \text{ for } 0 \leq i \leq N$$

where $f_i = \dfrac{i}{2NT}$ for $0 \leq i \leq n$.

In the above equation, $u(t_m)$ is the sampled signal at time $t_m$, $U(f_i)$ is the transformed signal in the frequency domain, $f_i$ represent the uniformly spaced frequencies, and $\tau_m$ is the interval between time $t_m$ and $t_{m-1}$. As will be apparent to one skilled in the art, the above described transform essentially corresponds to a conventional discrete Fourier Transform, where a weight is applied to each signal value that corresponds to the interval between samples.

In cases where very long (e.g., voids longer than 6 to 8 nominal sample periods) realized intervals are observed (as compared to the nominal interval), the corresponding sample values may be excessively weighted, possibly distorting the approximated spectrum.

Accordingly, an alternative technique is described wherein the weights applied to such samples are limited in a systematic way that conforms to a suitable statistical metric of the realized sampling process. In various embodiments, run length observations for void (missing) samples are recorded by the sampling device (using hardware or software or a combination) with sufficient memory depth to permit estimation of the run length probability density. In typical embodiments, the density will be assumed to approximate an alpha-stable random process.

The AFT algorithm is modified using the estimated sample run length probability density. For example, in some embodiments, the weight assigned to any given instance of a sampling void is made not to exceed the value of the random variable associated with a specified probability in the estimated alpha-stable density. In some embodiments, the accumulated weights so estimated inform the overall scaling applied to the approximate Fourier spectrum derived from the non-uniformly sampled input signal, but do not change the absolute age of the input signal for forecasting purposes. For example, in some cases, estimates using observed signals have shown that their spectra are approximately constant over intervals necessary to compensate for group delay in the filters used in embodiments of the techniques described above.

In various embodiments, the run length probability density may be estimated based on the run length observations using any suitable techniques known in the art, including, e.g., the techniques described in Reference [6]. In some embodiments, the estimates can be repeatedly (e.g., periodically) updated, to ensure that the run length probability density is not based on outdated observations.

As noted above, in some applications, the run length probability density may be approximated as an alpha-stable probability density. A random variable $X(t)$ is univariate stable if its distribution has the characteristic function (general asymmetric case)

$$\varphi(t) = e^{-\gamma^\alpha |u|^\alpha \left[1 + j\beta\left(\tan\frac{\pi}{2}\alpha\right)(\text{sgn } u)(|\gamma u|^{1-\alpha} - 1)\right] + j\delta u}$$

for $\alpha \neq 1$, or $$\varphi(t) = e^{-\gamma |u| \left[1 + j\beta\frac{2}{\pi}(\text{sgn } u)\ln|u|\right] + j\delta u}$$

for. $\alpha = 1$.

In the equations above $\alpha$ represents the characteristic exponent, aka tail or stability index defined on the interval $(0, 2]$;

β represent the skew factor defined on the interval [−1, 1], δ represent the location defined on the interval (−∞, ∞); and γ represent the scale (0, ∞). These parameters may be estimated based on the run length observations using any suitable techniques known in the art, including, e.g., the techniques described in Reference [6].

It is to be noted that estimated sample weights may be applied not only to the spectral recovery methods described above, but also to time domain convolution recovery methods as described in detail below.

Once the run length probability density has been estimated, the associated weights can be determined. In one embodiment, the weights are determined, e.g., using the following procedure.

One applies the void duration probability density as follows: (i) capture the sequence of realized sampling times (with limits on sequence length informed by signal characteristics and practical limitations of implementation of the associated algorithms), (ii) estimate the probability density of the realized sampling times (e.g., under the assumption that the realized sampling times approximate an alpha-stable random process), (iii) compute the cumulative distribution function (CDF) from the density estimated in step (ii), (iv) compute the number of void increments as the ratio of the realized sample time to the nominal base sample time, (v) compute the incremental weight assigned to a given sample realization as the summation of the ratios of the displacement of the CDF from unity at each incremental sample time up to the present realized sample time to the displacement of the alpha-stable CDF from unity at the nominal base sample time.

In some embodiments, e.g., for applications where computational simplicity is required, the sample weights may be assigned incrementally in the manner outlined above except that the incremental weights are predetermined by one of a number of schemes intended to limit the incremental weight applied as the sampling void time dilates. This can be accomplished by adjusting the weights by applying an adjustment function that is a function of the associated sampling void time. The adjustment function may have any suitable dependence on the void time, e.g., linear, first order, logistic, etc.

Although it is to be understood that the above described techniques can be implemented in a variety of ways, the following provides an exemplary description of a calculation of alpha-stable probability adjusted weights for a non-uniformly sampled signal.

Let $P_\alpha(\tau)$ represent the estimated α-stable CDF (e.g., determined using the techniques described above and/or in Reference [6]). Let $\Delta t$ represent the nominal sampling period. Let $\tau_m = N_m \Delta t$ represent the present realized sample interval obtained at time $t_m$, possibly following a sampling void, as a multiple of the nominal sampling period. Let the realized sample interval be decomposed into $N_m$ incremental nominal sampling periods as $\tau_n = n\Delta t$, n=1, ... $N_m$. Then the assigned incremental sample weights are estimated as follows:

$$\Delta c(\tau_n) = \frac{1 - P(\tau_n)}{1 - P(\Delta t)}.$$

The weight corresponding to the realized sample interval may then be determined as $$c(\tau_m) = \sum_{n=1}^{N_m} \Delta c(\tau_n).$$

$$c_m \equiv c(\tau_m) = \sum_{n=1}^{N_m} \Delta c(\tau_n)$$

As noted above, in some embodiments, the weights may alternatively be calculated using a predetermined adjustment that is a function of the realized sample interval. For example, a logistic (sigmoid) formulation may be used as follows. Let $n_L$ represent the location of the logistic function inflection point. Let β represent the scale of the logistic function. Then the assigned incremental sample weights are prescribed as follows:

$$\Delta c(\tau_n) = 1 - \frac{1}{1 + e^{(n_L - n)\beta}}.$$

In some embodiments, the parameters of the logistic function may be estimated in a manner similar in principle to that used for the alpha-stable distribution (i.e., based on capture of the sequence of realized sampling times). The estimate may be performed using any suitable technique known in the art, e.g., those described in Reference [7].

Once again, the weight corresponding to the realized sample interval may then be determined as $$c_m \equiv c(\tau_m) = \sum_{n=1}^{N_m} \Delta c(\tau_n).$$

Once the sample weights have been determined, the modified AFT may be calculated in a straightforward fashion based on the expression $$U(f_i) = \frac{\sum_{m=1}^{M} c_m u(t_m) e^{-j2\pi f_i t_m}}{\sum_{m=1}^{M} c_m}.$$

II. MODIFIED INVERSE TRANSFORM

The foregoing describes a signal recovery and prediction algorithm that produces a recovered signal having, in some embodiments, the following characteristics. First, the sampling interval is decimated with respect to the nominally expected sampling interval of the input signal, the latter characterized as non-uniformly sampled in that some samples expected at the nominally uniform sample instants are missing. Second, the low-pass information present in the input signal is preserved up to some specified bandwidth; and third, the recovery algorithm allows computation of samples of the recovered signal up to the present time, effectively the future with respect to the filtered input signal, such that the physically necessary delay introduced by the filtering operation is eliminated.

In some applications it is desirable to retain as much of the spectral content of the input signal as possible. For example, as detailed below, U.S. Patent Pub. No. 2010/0090674 A1 describes a power system control technique that applies band pass and/or high pass filters to a signal prior to estimation of scale statistics e.g. variance or dispersion. In such cases retention of the spectral content of the signal in the relevant frequency band and/or at high frequencies would be advantageous.

Some embodiments of the techniques described above are not suitable for applications requiring retention of the high-frequency content of the input signal spectrum. Accordingly, in some embodiments, an alternative inverse transform procedure may be used. In some embodiments, the recovery process uses the sample compaction and AFT procedures disclosed above (or modified versions thereof described in the instant application). In some embodiments, a new inverse transform is an extension and modification of the "Adaptive weight conjugate gradient Toeplitz" (ACGT) algorithm as described in References [1] and [2]. The ACGT algorithm is an iterative method used to recover a band limited signal from sequence of irregularly spaced sampling values. That is, in typical embodiments, the ACGT algorithm will operate iteratively until some conversion criterion is reached.

In some embodiments, the recovery algorithm may be implemented using the following steps. In a first step, an initial convergence criterion is specified for the ACGT algorithm.

In the next step, one acquires and compact input signal, e.g., using any of the techniques as described herein.

In the next step, one estimates the signal spectrum, e.g., using the AFT as disclosed above or the modified AFT described above.

In the next step, one estimates the recovered (uniformly sampled) signal using the ACGT such that the recovered sampling interval is the desired nominal interval for the input signal. In some embodiments, the recovered signal includes a specified number of forecasted (predicted or future) samples according to the requirements of the application at hand (e.g., based on the filter group delay present in the system. In the next step, one records the number of iterations of the ACGT algorithm required to achieve specified convergence criteria.

In the next step, one applies suitable filtering to the recovered signal in the time domain, using any suitable technique known in the art (e.g., convolution based techniques).

In the next step, one revises convergence criteria consistent with prior convergence performance and sample availability of each input signal realization.

In some applications, e.g., certain real-time control applications, it may be necessary to constrain the allowable number of iterations of the ACGT algorithm to conserve computational resources. Accordingly, situations may arise in which convergence determined on the basis of some absolute error criterion is untenable. Therefore, in some embodiments, an additional criterion is used which may be simultaneously examined. For example, in some embodiments, the rate of decrease of the absolute error may be used. If the rate of decrease is below some threshold, then the benefit of additional iterations will not be worth the cost of their computation. In various embodiments, the number of iterations allowed may also be limited to a specified number.

III. TIME DOMAIN SIGNAL RECOVERY

In some embodiments, a recovered signal with values at uniform time intervals may be approximated from a non-uniformly sampled input signal (e.g., having void samples) using time-domain only techniques, e.g., convolution based procedures. In some embodiments, these procedures can remove the need for the transform into the spectral domain (and corresponding inverse transform step) used in embodiments of the techniques described above.

For example, in some embodiments, techniques of the type described in Reference [3] (e.g., Algorithm 1 and Algorithm 2) may be used. In some cases, the non-uniformly sample input signal is convolved with a filter impulse response function to generate the uniformly resampled recovered signal (e.g., as described in Reference [3]—Algorithm 2). In one exemplary embodiment, this convolution interpolation technique is implemented as follows.

Let $t_k$ be the non-uniform sample times. Let $u(t_k)$ be the input signal sample at sample time $t_k$. Let $h(t)$ be the impulse response for a filter. Let the resampling period equal $1/T$. Then the recovered signal having sample values at M uniform intervals may be calculated as $$v(mT) = \frac{1}{t_n} \sum_{k=1}^{n} (t_k - t_{k-1}) h(mT - t_k) u(t_k),$$

where $m = 1, 2, 3, \ldots M$.

Note that, similar to the AFT algorithm discussed above, each term in the above convolution summation is weighted by a factor that is proportional to the corresponding realized sample interval. In cases where very long (e.g., voids longer than 6 to 8 nominal sample periods) realized intervals are observed (as compared to the nominal interval), the corresponding sample values may be excessively weighted, possibly distorting the recovered signal.

In some embodiments, the weighting may be modified using a similar approach to that described above with respect to the modified AFT algorithm. As in that case, the weights applied to the samples are limited in a systematic way that conforms to a suitable statistical metric of the realized sampling process. In various embodiments, run length observations for void (missing) samples are recorded by the sampling device (using hardware or software or a combination) with sufficient memory depth to permit estimation of the run length probability density. In typical embodiments, the density will be assumed to approximate an alpha-stable random process.

The modified weighting may determined based on an estimated sample run probability density function. For example, in some embodiments, the weight assigned to any given instance of a sampling void is made not to exceed the value of the random variable associated with a specified probability in the estimated alpha-stable density.

In general, the assigned weights may be determined using any of the techniques described above with reference to the modified AFT (e.g., based on an estimate of an alpha-stable density function for the run length, or where incremental weights are predetermined by a schemes intended to limit the incremental weight applied as the sampling void time dilates).

Once the sample weights have been determined, the modified convolution interpolation may be implemented in a straightforward fashion, e.g., based on the expression $$v(mT) = \frac{\sum_{k=1}^{n} c_k h(mT - t_k) u(t_k)}{\sum_{k=1}^{n} c_k},$$

where $c_k$ is the weight corresponding to the $k^{th}$ sample interval.

In various embodiments, the run length probability density may be estimated based on the run length observations using any suitable techniques known in the art, including, e.g., the techniques described in Reference [6]. In some embodiments, the estimates can be repeatedly (e.g., periodically) updated, to ensure that the run length probability density is not based on outdated observations.

The convolution procedures described above use a specified filter in the time domain. In various embodiments, any suitable filter may be used. In some embodiments, a low pass filter, e.g. a low pass linear phase filter, may be used. A low pass filter may be advantageous when processing a signal in a control system. However, other spectral selectivity types may be useful depending on the intended use of the processed signal. For example, when using the signal to estimate a scale statistic, (e.g., a variance), use of a high pass filter may be advantageous. For example, the signal recovery techniques described herein may be applied to the techniques described in U.S. Patent Pub. No. US2010/0090674 A1, published Apr. 15, 2010. This publication describes an electric power control system and process where a measured signal is analyzed to form the basis of decisions for controlling, e.g., a voltage regulating transformer. The analysis looks not only at a voltage signal but also at voltage dispersion (a generalization of variance). For the latter case, in some embodiments, it may be appropriate to use a high pass filter in conjunction with the signal recovery techniques described above.

In various time domain based signal recovery procedures, the recovered signal will necessarily be decimated since no estimate is made of the signal properties (in contrast with the spectral recovery methods). In various embodiments, the techniques described in the present disclosure may improve the retention of information in the recovered signal.

IV. CONCLUSION

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of nonvolatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a viewer, the above described techniques can be implemented on a computer having a display device. The display device can, for example, be a cathode ray tube (CRT) and/or a liquid crystal display (LCD) monitor. The interaction with a viewer can, for example, be a display of information to the viewer and a keyboard and a pointing device (e.g., a mouse or a trackball) by which the viewer can provide input to the computer (e.g., interact with a viewer interface element). Other kinds of devices can be used to provide for interaction with a viewer. Other devices can, for example, be feedback provided to the viewer in any form of sensory feedback (e.g., visual feedback, auditory feedback, or tactile feedback). Input from the viewer can, for example, be received in any form, including acoustic, speech, and/or tactile input. The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical viewer interface, a Web browser through which a viewer can interact with an example implementation, and/or other graphical viewer interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The communication network can include, for example, a packet-based network and/or a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The communication device can include, for example, a computer, a computer with a browser device, a telephone, an IP phone, a mobile device (e.g., cellular phone, personal digital assistant (PDA) device, laptop computer, electronic mail device), and/or other type of communication device. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

The scope of the present invention is not limited by what has been specifically shown and described hereinabove. Those skilled in the art will recognize that there are suitable alternatives to the depicted examples of materials, configurations, constructions and dimensions. Numerous references, including patents and various publications, are cited and discussed in the description of this invention. The citation and discussion of such references is provided merely to clarify the description of the present invention and is not an admission that any reference is prior art to the invention described herein. All references cited and discussed in this specification are incorporated herein by reference in their entirety.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

REFERENCES

[1] H G Feichtinger and T Strohmer, "Recovery of missing segments and lines in images", Numerical Harmonic Analysis Group, University of Vienna, Vienna Austria.
[2] C Cenker, H G Feichtinger, and H Steier, "Fast Iterative and Non-iterative Reconstruction of Band-limited Functions from Irregular Sampling Values", University of Vienna, Vienna Austria.
[3] F Eng and F Gustafsson, "Algorithms for Downsampling Non-uniformly Sampled Data", Linköpings Universitet, Linköping Sweden.
[4] J H McCulloch, "Simple Consistent Estimators of Stable Distribution Parameters", Comm. Stat. Simul. Comput 15(4), Marcel Dekker, 1986.
[5] C L Nikias, M Shao, "Signal Processing with Alpha-Stable Distributions and Applications", Wiley 1995.
[6] C R Dance and E E Kuruoglu, "Estimation of the Parameters of Skewed α-Stable Distributions", Xerox Research Centre, Cambridge, UK, 1999.
[7] S S Gupta and M Gnanadesikan, "Estimation of the parameters of the logistic distribution", Biometrika vol. 53 (3-4), pp. 565-570, 1966.

APPENDIX A

| Docket No. | Client Ref. | Country | Matter Type | Status | Matter Title |
|---|---|---|---|---|---|
| 102555-0107 | | United States of America | Patents | Pending | ELECTRIC POWER CONTROL SYSTEM AND EFFICIENCY OPTIMIZATION PROCESS FOR A POLYPHASE SYNCHRONOUS MACHINE |
| 102555-0108 | | United States of America | Patents | Pending | ELECTRIC POWER CONTROL SYSTEM AND PROCESS |
| 102555-0109 | | United States of America | Patents | Pending | MESH DELIVERY SYSTEM |
| 102555-0110 | | United States of America | Patents | Inactive | MESH DELIVERY SYSTEM |
| 102555-0111 | | P.C.T. | Patents | Pending | MESH DELIVERY SYSTEM |
| 102555-0112 | | United States of America | Patents | Pending | SYSTEM AND METHOD FOR ESTIMATING PERFORMANCE METRICS OF CONSERVATION VOLTAGE REDUCTION (CVR) SYSTEMS AND VOLT/VAR OPTIMIZATION SYSTEMS |
| 102555-0113 | | United States of America | Patents | Granted | ELECTRICAL POWER DISTRIBUTION CONTROL SYSTEMS AND PROCESSES |
| 102555-0114 | | Canada | Patents | Pending | ELECTRICAL POWER DISTRIBUTION CONTROL SYSTEMS AND PROCESSES |
| 102555-0115 | | United States of America | Patents | Pending | AUGMENTED MESH DELIVERY SYSTEM |

| Docket No. | Application No. | Application Date | Publication No. | Publication Date | Pat./Reg. No. |
|---|---|---|---|---|---|
| 102555-0107 | 12/540,366 | Aug. 13, 2009 | 2010-0085004 | Apr. 8, 2010 | |
| 102555-0108 | 12/540,364 | Aug. 13, 2009 | 2010-0090674 | Apr. 15, 2010 | |
| 102555-0109 | 13/369,794 | Feb. 9, 2012 | | | |
| 102555-0110 | 61/441,224 | Feb. 9, 2011 | | | |
| 102555-0111 | PCT/US2012/024519 | Feb. 9, 2012 | WO2012/109465 | Aug. 16, 2012 | |
| 102555-0112 | 61/605,609 | Mar. 1, 2012 | | | |
| 102555-0113 | 11/387,091 | Apr. 4, 2006 | 2006-0195229 | Aug. 31, 2006 | 7,729,810 |
| 102555-0114 | 2,649,838 | Apr. 6, 2006 | | | |
| 102555-0115 | 61/680,960 | Aug. 8, 2012 | | | |

What is claimed is:
1. A method comprising:
receiving, by a controller at a destination node, signal samples and associated sampling time indications, the signal samples and the associated sampling time indications being received from a source node via a mesh network, the signal samples being delivered with sam- pling time indications generated at the source node to form a series of signals corresponding to one or more characteristics related to electricity sensed by a sensor;

applying, by the controller, a compacting algorithm to the signal samples and the associated sampling time indications to generate a paired vector comprising compacted signal samples and an associated compacted sampling time indication;

transforming the paired vector representing the compacted signal samples in a time domain into a discrete Fourier spectrum of the signal samples in a frequency domain using a modified Approximate Fourier Transform such that a discrete Fourier spectrum of the compacted signal samples is uniformly sampled in the frequency domain;

applying a filter in the frequency domain to the discrete Fourier spectrum of the signal samples to generate a filtered discrete spectral representation; and applying an inverse discrete Fourier transform to the filtered discrete spectral representation to generate a recovered signal in the time domain that is uniformly sampled, wherein a weighting of sample values in the modified Approximate Fourier Transform is determined at least partially based on information indicative of a statistical behavior of a corresponding realized sample process.

2. The method of claim 1, further comprising providing an adjustment signal to adjust the one or more characteristics of the electricity based on the recovered signal.

3. The method of claim 1, wherein applying the filter in the frequency domain to the discrete Fourier spectrum of the signal samples to generate the filtered discrete spectral representation comprises:
applying a bandpass filter in the frequency domain to the discrete Fourier spectrum of the signal samples.

4. The method of claim 1, wherein applying the filter in the frequency domain to the discrete Fourier spectrum of the signal samples to generate the filtered discrete spectral representation comprises:
applying a low pass filter in the frequency domain to the discrete Fourier spectrum of the signal samples.

5. The method of claim 4, wherein attenuation characteristics of the low pass filter are set related to the rate at which the one or more characteristics of the electricity can be adjusted.

6. The method of claim 1, wherein applying the compacting algorithm to the signal samples and the associated sampling time indications to generate the paired vector comprising the compacted signal samples and the associated compacted time indication comprises:
determining void indications in the signal samples; and
indicating a sampling time for each of the void indications.

7. The method of claim 1, wherein the one or more characteristics related to the electricity sensed by the sensor comprise at least one from the list consisting of: voltage, current, real power, power flow direction, reactive power, temperature or humidity.

8. The method of claim 1, wherein the mesh network includes a plurality of emitters, wherein a first emitter of the plurality of emitters is configured to connect to a second one of the plurality of emitters to form a path to deliver signals between the source node and the destination node, and wherein at least the first emitter is configured to automatically connect to a third emitter of the plurality of emitters to form a new path between the source node and the destination node when interference is present between the first emitter and the second emitter.

9. The method of claim 1, wherein applying the inverse discrete Fourier transform to the filtered discrete spectral representation to generate the recovered signal in the time domain that is uniformly sampled comprises:
extrapolating future values of the recovered signal in the time domain by setting a time basis in the inverse discrete Fourier transform to be greater than a total time span of the compacted signal samples; and
providing an adjustment signal to adjust the one or more characteristics of the electricity based on the recovered signal,
wherein the adjustment signal is provided based on the future values to compensate for a group delay of the filter.

10. The method of claim 1, wherein the signal samples are non-uniformly delivered to the destination node from the source node via the mesh network.

11. The method of claim 1, further comprising: delivering the signal samples with an associated sampling time indication or with delivery time indications.

12. The method of claim 1, wherein the associated compacted sampling time indication is derived from an actual sample interval for each sample, wherein the actual sample interval is a time difference between that of a present sample and a previous sample.

13. A method comprising:
receiving, by a controller at a destination node, signal samples and associated sampling time indications, the signal samples and the associated sampling time indications being received from a source node via a mesh network, the signal samples being delivered with sampling time indications generated at the source node to form a series of signals corresponding to one or more characteristics related to electricity sensed by a sensor;
applying, by the controller, a compacting algorithm to the signal samples and the associated sampling time indications to generate a paired vector comprising
compacted signal samples and an associated compacted sampling time indication;
transforming the paired vector representing the compacted signal samples in a time domain into a discrete Fourier spectrum of the signal samples in a frequency domain using an Approximate Fourier Transform such that the discrete Fourier spectrum of the compacted signal samples is uniformly sampled in the frequency domain; and
based on the discrete Fourier spectrum, applying an iterative Adaptive weight conjugate gradient Toeplitz (ACGT) procedure to generate a recovered signal in the time domain that is uniformly sampled.

14. The method of claim 13, further comprising, prior to applying the ACGT procedure, specifying an initial convergence criteria for the ACGT procedure.

15. The method of claim 14, further comprising estimating a uniformly sampled recovered signal using the ACGT procedure such that a recovered sampling interval is a desired nominal interval for the signal samples.

16. The method of claim 15, wherein the recovered signal includes a specified number of forecasted samples.

17. The method of claim 13, further comprising determining convergence information indicative of a number of iterations of the ACGT procedure required to achieve an initial convergence criteria.

18. The method of claim 17, further comprising determining a revised convergence criteria based on the convergence information and information indicative of sample availability of each input signal realization.

19. The method of claim 17, wherein the convergence information is determined based on the initial convergence criteria other than an absolute error criterion.

20. The method of claim 19, wherein the initial convergence criteria is based at least in part on a rate of decrease of absolute error.

21. The method of claim 13, further comprising constraining an allowable number of iterations of the ACGT procedure.

22. The method of claim 13, further comprising providing an adjustment signal to adjust the one or more characteristics of the electricity based on the recovered signal.

23. The method of claim 13, further comprising applying a bandpass filter in the frequency domain to the discrete Fourier spectrum of the signal samples to generate a filtered discrete spectral representation.

24. The method of claim 13, further comprising applying a low pass filter in the frequency domain to the discrete Fourier spectrum of the signal samples to generate a filtered discrete spectral representation of the compacted signal samples.

25. The method of claim 24, wherein attenuation characteristics of the low pass filter are set related to a rate at which the one or more characteristics of the electricity are adjusted.

26. The method of claim 13, further comprising:
applying a filter in the frequency domain to the discrete Fourier spectrum of the signal samples to generate a filtered discrete spectral representation of the compacted signal samples; and
applying an inverse discrete Fourier transform to the filtered discrete spectral representation to generate the recovered signal in the time domain that is uniformly sampled.

27. The method of claim 13, wherein applying with the controller the compacting algorithm to the signal samples and the associated sampling time indications to generate the paired vector comprising the compacted signal samples and the associated compacted time indication comprises:
determining void indications in the received signal samples; and
indicating a sampling time for each of the void indications.

28. The method of claim 13, wherein the one or more characteristics related to the electricity comprise at least one from the list consisting of: voltage, current, real power, power flow direction, reactive power, temperature or humidity.

29. The method of claim 13, wherein the mesh network includes a plurality of emitters, wherein a first emitter of the plurality of emitters is configured to connect to a second one of the plurality of emitters to form a path to deliver signals between the source node and the destination node, and wherein at least the first emitter is configured to automatically connect to a third emitter of the plurality of emitters to form a new path between the source node and the destination node when interference is present between the first emitter and the second emitter.

30. The method of claim 13, further comprising:
applying a filter in the frequency domain to the discrete Fourier spectrum of the signal samples to generate a filtered discrete spectral representation of the compacted signal samples;
applying an inverse discrete Fourier transform to the filtered discrete spectral representation to generate the recovered signal in the time domain that is uniformly sampled;
extrapolating future values of the recovered signal in the time domain by setting a time basis in the inverse discrete Fourier transform to be greater than a total time span of the compacted signal samples, and
wherein an adjustment signal is provided based on the future values to compensate for a group delay of the filter.

31. The method of claim 13, wherein the signal samples are non-uniformly delivered to the destination node from the source node via the mesh network.

32. The method of claim 13, further comprising:
delivering the signal samples with an associated sampling time indication or with delivery time indications.

33. The method of claim 13, wherein the associated compacted sampling time indication is derived from an actual sample interval for each sample, wherein the actual sample interval is a time difference between that of a present sample and a previous sample.

34. An apparatus comprising:
a controller having one or more processors that;
receives at a destination node signal samples and associated sampling time indications, the signal samples and the associated sampling time indications being received from a source node via a mesh network, the signal samples being delivered with sampling time indications generated at the source node to form a series of signals corresponding to one or more characteristics related to electricity sensed by a sensor;
applies a compacting algorithm to the signal samples and the associated sampling time indications to generate a paired vector comprising compacted signal samples and an associated compacted sampling time indication;
transforms the paired vector representing the compacted sampled signal in a time domain into a discrete Fourier spectrum of the signal samples in a frequency domain using a modified Approximate Fourier Transform such that a discrete Fourier spectrum of the compacted signal samples is uniformly sampled in the frequency domain;
applies a filter in the frequency domain to the discrete Fourier spectrum of the signal samples to generate a filtered discrete spectral representation; and
applies an inverse discrete Fourier transform to the filtered discrete spectral representation to generate a recovered signal in the time domain that is uniformly sampled,
wherein weighting of sample values in the modified Approximate Fourier Transform is determined at least partially based on information indicative of a statistical behavior of a corresponding realized sample process.

35. A non-transitory computer readable storage medium storing computer executable instructions that when executed by one or more processors, cause the one or more processors to perform operations comprising:
receiving at a destination node signal samples and associated sampling time indications, the signal samples and the associated sampling time indications being received from a source node via a mesh network, the signal samples being delivered with sampling time indications generated at the source node to form a series of signals corresponding to one or more characteristics related to electricity sensed by a sensor;
applying a compacting algorithm to the signal samples and the associated sampling time indications to generate a paired vector comprising compacted signal samples and an associated compacted sampling time indication;
transforming the paired vector representing the compacted signal samples in a time domain into a discrete Fourier spectrum of the signal samples in a frequency domain using a modified Approximate Fourier Transform such that a discrete Fourier spectrum of the compacted signal samples is uniformly sampled in the frequency domain;

applying a filter in the frequency domain to the discrete Fourier spectrum of the signal samples to generate a filtered discrete spectral representation; and applying an inverse discrete Fourier transform of the filtered discrete spectral representation to generate a recovered signal in the time domain that is uniformly sampled, wherein the weighting of sample values in the modified Approximate Fourier Transform is determined at least partially based on information indicative of a statistical behavior of a corresponding realized sample process.

* * * * *